US012612493B2

(12) United States Patent
  Isobe

(10) Patent No.: US 12,612,493 B2
(45) Date of Patent: Apr. 28, 2026

(54) CELLULOSE MOLDED BODY AND HYDROGEL, AND METHOD FOR PRODUCING THE SAME

(71) Applicant: Japan Agency for Marine-Earth Science and Technology, Kanagawa (JP)

(72) Inventor: Noriyuki Isobe, Yokosuka (JP)

(73) Assignee: Japan Agency for Marine-Earth Science and Technology, Kanagawa (JP)

( * ) Notice: Subject to any disclaimer, the term of this patent is extended or adjusted under 35 U.S.C. 154(b) by 944 days.

(21) Appl. No.: 17/775,560

(22) PCT Filed: Oct. 23, 2020

(86) PCT No.: PCT/JP2020/039874
§ 371 (c)(1),
(2) Date: May 9, 2022

(87) PCT Pub. No.: WO2021/095489
PCT Pub. Date: May 20, 2021

(65) Prior Publication Data
US 2022/0389173 A1      Dec. 8, 2022

(30) Foreign Application Priority Data
Nov. 12, 2019    (JP) ................................. 2019-204772

(51) Int. Cl.
  *C08J 3/075*        (2006.01)
  *C08J 5/22*         (2006.01)
(52) U.S. Cl.
  CPC ............. *C08J 3/075* (2013.01); *C08J 5/2212* (2013.01); *C08J 2301/02* (2013.01)

(58) Field of Classification Search
None
See application file for complete search history.

(56) References Cited

U.S. PATENT DOCUMENTS 2,737,437 A       3/1956  Bechtold
4,024,073 A  *    5/1977  Shimizu ................ C08B 31/003
                                                        536/29.1
(Continued)

FOREIGN PATENT DOCUMENTS

CN       101177488 A      5/2008
CN       101880410 A      11/2010
(Continued)

OTHER PUBLICATIONS

International Search Report issued in PCT/JP2020/039874; mailed Jan. 19, 2021.

(Continued)

*Primary Examiner* — Stefanie J Cohen
(74) *Attorney, Agent, or Firm* — Studebaker Brackett PLLC

(57) ABSTRACT

A method for producing a hydrogel according to the present disclosure includes: (A1) a step of preparing an object to be treated including a water-soluble cellulose-based compound and water; (B1) a step of heating the object to be treated so as to separate water from the object to be treated; and (C1) a step of cooling the object to be treated that has acquired an increased content percentage of the cellulose-based compound through the treatment in step (B1), and a series of steps from step (B1) to step (C1) are repeated until the content percentage of the cellulose-based compound in the object to be treated reaches 10% by mass or more.

8 Claims, 2 Drawing Sheets

(56) References Cited

U.S. PATENT DOCUMENTS

| | | | | |
|---|---|---|---|---|
| 4,123,408 A * | 10/1978 | Gordon | ............... | G02B 1/043 |
| | | | | 264/2.6 |
| 5,576,072 A * | 11/1996 | Hostettler | ............ | A61L 29/085 |
| | | | | 427/508 |
| 5,962,005 A | 10/1999 | Saga et al. | | |
| 8,633,254 B2 * | 1/2014 | Takigami | ............... | C08J 3/075 |
| | | | | 514/781 |
| 2005/0287087 A1 | 12/2005 | Huang et al. | | |
| 2007/0254024 A1 | 11/2007 | Cade et al. | | |
| 2013/0032059 A1 | 2/2013 | Trexler et al. | | |

FOREIGN PATENT DOCUMENTS

| | | | |
|---|---|---|---|
| CN | 103417473 A | 12/2013 | |
| CN | 107964126 A | 4/2018 | |
| JP | S62-074609 A | 4/1987 | |
| JP | H03-041101 A | 2/1991 | |
| JP | 2001-316401 A | 11/2001 | |
| JP | 2011-500871 A | 1/2011 | |
| JP | 2014-522442 A | 9/2014 | |
| JP | 2015-208874 A | 11/2015 | |
| JP | 2016-160330 A | 9/2016 | |
| KR | 10-2017-0109221 A | 9/2017 | |
| WO | 2008/050209 A1 | 5/2008 | |
| WO | 2012/170682 A1 | 12/2012 | |
| WO | WO-2019022817 A1 * | 1/2019 | .............. A61K 9/06 |
| WO | WO-2019022819 A1 * | 1/2019 | .............. C08L 1/32 |
| WO | 2019/108264 A1 | 6/2019 | |

OTHER PUBLICATIONS

The extended European search report issued by the European Patent Office on Jan. 30, 2024, which corresponds to European Patent Application No. 20886872.9-1102 and is related to U.S. Appl. No. 17/775,560.

Isobe Noriyuki et al, "Cellulose hydrogel with tunable shape and mechanical properties: From rigid cylinder to soft scaffold", International Journal of Biological Macromolecules, vol. 117, May 17, 2018, pp. 625-631, XP093116508, NL, ISSN: 0141-8130, DOI: 10.1016/j.ijbiomac.2018.05.071.

Zhang Xueqin et al., "Preparation and Characterization of Regenerated Cellulose Film from a Solution in Lithium Bromide Molten Salt Hydrate", Polymers, vol. 10, No. 6, Jun. 4, 2018, p. 614, XP093050298, DOI: 10.3390/polym 10060614.

The partial supplementary European search report (R. 164 EPC) issued by the European Patent Office on Sep. 28, 2023, which corresponds to European Patent Application No. 20886872.9-1102 and is related to U.S. Appl. No. 17/775,560.

Notification of Transmittal of Translation of the International Preliminary Report on Patentability and Translation of Written Opinion of the International Searching Authority; PCT/JP2020/039874; mailed on May 27, 2022.

* cited by examiner

METHYLCELLULOSE CONTENT PERCENTAGE
OF OBJECT TO BE TREATED (% BY MASS)

CELLULOSE MOLDED BODY AND HYDROGEL, AND METHOD FOR PRODUCING THE SAME

TECHNICAL FIELD

The present disclosure relates to a cellulose-based molded body and a hydrogel, and methods for producing these.

BACKGROUND ART

In recent years, marine pollution caused by petroleum-derived plastics is becoming apparent. As materials that substitute for petroleum-derived plastics, attention has been paid to biodegradable plastics such as polylactic acid and microbially produced polyesters. However, it has been pointed out that the degradation rate of biodegradable plastics in the ocean is generally slow, and as a result, biodegradable plastics may bring about pollution that is not different from petroleum-derived plastics (for example, accumulation in living organisms and accidental ingestion by animals).

Cellulose-based compounds, which are edible polysaccharides, may serve as materials that substitute for petroleum-derived plastics. It has been hitherto investigated to produce a membrane or a molded body by utilizing cellulose-based compounds. For example, Patent Literature 1 discloses a method for producing a molded body by pressure-molding a powder of a cellulose material. Patent Literature 2 discloses a gas-permeable membrane that utilizes the humidity sensitivity of regenerated cellulose.

CITATION LIST

Patent Literature

Patent Literature 1: Japanese Unexamined Patent Publication No. S62-74609

Patent Literature 2: Japanese Unexamined Patent Publication No. 2015-208874

SUMMARY OF INVENTION

Technical Problem

Meanwhile, cellophane is a film formed from cellulose. Cellophane is thin with a thickness of about 50 µm and has transparency. However, a technology for producing cellophane having a larger thickness while maintaining the transparency of cellophane has not been hitherto established. For example, according to the method described in Patent Literature 1, a molded body having a certain thickness can be produced; however, the molded body does not necessarily have transparency.

The present disclosure provides a cellulose-based molded body having a certain thickness and having transparency, and a method for producing the cellulose-based molded body. Furthermore, the present disclosure provides a hydrogel useful for the production of the cellulose-based molded body and a method for producing the hydrogel.

Solution to Problem

One aspect of the present disclosure relates to a method for producing a hydrogel. This production method includes the following steps, and a series of steps from step (B1) to step (C1) are repeated until the content percentage of a cellulose-based compound in an object to be treated reaches 10% Y by mass or more:

(A1) a step of preparing an object to be treated including a water-soluble cellulose-based compound and water;

(B1) a step of heating the object to be treated so as to separate water from the object to be treated; and (C1) a step of cooling the object to be treated that has acquired an increased content percentage of the cellulose-based compound through the treatment of step (B1).

According to this production method, a hydrogel including a water-soluble cellulose-based compound and water and having a content percentage of the cellulose-based compound of 10% by mass or more is obtained. This production method can gradually reduce water included in the object to be treated, by repeating a series of steps from step (B1) to step (C1). In other words, the production method is based on the exclusive findings of the inventor of the present invention that the content percentage of the cellulose-based compound in the object to be treated can be gradually increased.

One aspect of the present disclosure relates to a method for producing a cellulose-based molded body from the above-described hydrogel. This production method includes the following steps:

(a) a step of preparing the hydrogel;

(b) a step of heating a molded body of the hydrogel in a state in which pressing force is applied to the molded body; and (c) a step of obtaining a cellulose-based molded body having a content percentage of the cellulose-based compound of 95% by mass or more through the heating treatment in step (b).

According to this production method, a cellulose-based molded body having a certain thickness (for example, a thickness of 0.5 mm or more), having transparency (for example, a haze of 20% or less), and having a content percentage of a cellulose-based compound of 95% by mass or more can be obtained.

One aspect of the present disclosure relates to a method for producing a cellulose-based molded body by using an aqueous solution of lithium bromide and cellulose. This production method includes the following steps:

(A2) a step of dissolving cellulose in an aqueous solution of lithium bromide under the temperature conditions of 100° C. or higher to obtain a cellulose-containing liquid;

(B2) a step of obtaining a molded body from the cellulose-containing liquid;

(C2) a step of removing lithium bromide from the molded body by washing the molded body;

(D2) a step of heating the molded body after the removal of lithium bromide, in a state in which pressing force is applied to the molded body; and (E2) a step of obtaining a cellulose-based molded body having a content percentage of cellulose of 95% by mass or more through the heating treatment in step (D2).

According to this method, a cellulose-based molded body having a certain thickness (for example, a thickness of 0.5 mm or more), having transparency (for example, a haze of 50% or less), and having a content percentage of a cellulose-based compound of 95% by mass or more can be obtained by heating the molded body after the removal of lithium bromide in a state in which pressing force is applied to the molded body.

Advantageous Effects of Invention

According to the present disclosure, a cellulose-based molded body having a certain thickness and having transparency, and a method for producing the same are provided. Furthermore, according to the present disclosure, a hydrogel useful for the production of the cellulose-based molded body, and a method for producing the same are provided.

DESCRIPTION OF EMBODIMENTS

Figure 1:
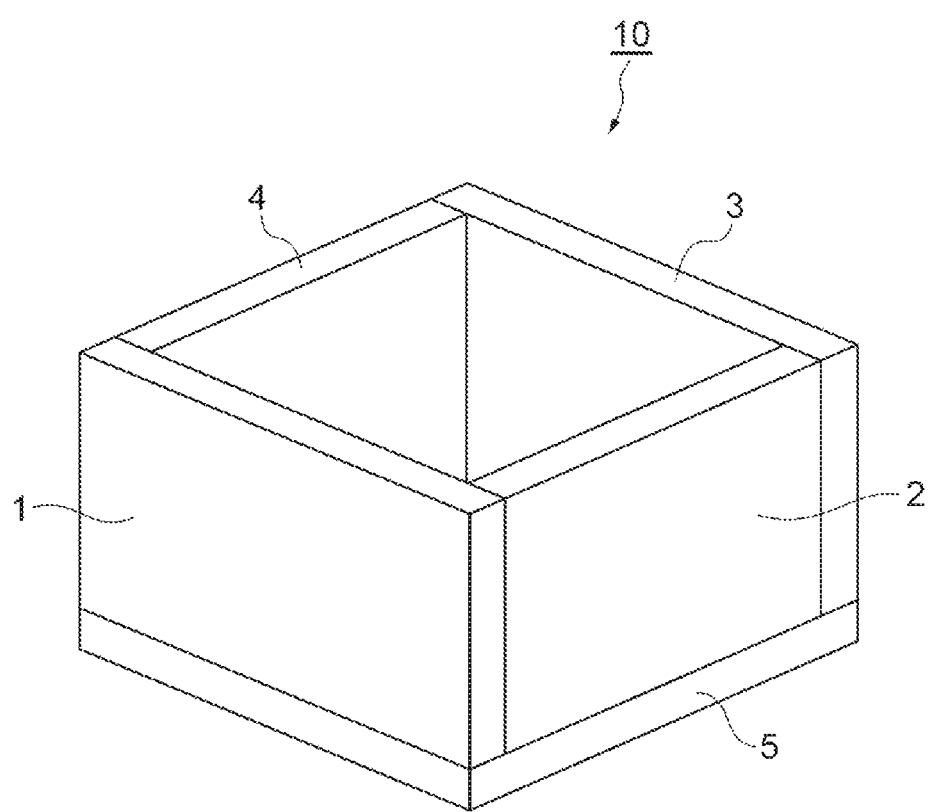
FIG. 1 is a perspective view schematically illustrating an example of a cellulose-based structure composed of a cellulose-based molded body according to an embodiment of the present disclosure.

Hereinafter, a plurality of embodiments of the present disclosure will be described in detail. The present invention is not intended to be limited to the embodiments that will be described below. Incidentally, in a numerical value range described in stepwise in the present specification, the upper limit value or lower limit value of a numerical value range of a certain stage may be replaced with the upper limit value or lower limit value of a numerical value range of another stage. In a numerical value range described in the present specification, the upper limit value or lower limit value of the numerical value range may be replaced with a value described in the Examples. In the present specification, the term hydrogel means a composition of a disperse system containing water, the composition being in a solid state.

First Embodiment (Hydrogel and Method for Producing the Same)

A method for producing a hydrogel according to the present embodiment includes the following steps, and a series of steps from step (B1) to step (C1) are repeated until the content percentage of a cellulose-based compound in an object to be treated reaches 10% by mass or more:

(A1) a step of preparing an object to be treated including a water-soluble cellulose-based compound and water;

(B1) a step of heating the object to be treated so as to separate water from the object to be treated; and (C1) a step of cooling the object to be treated that has acquired an increased content percentage of the cellulose-based compound through the treatment in step (B1).

Hereinafter, each of the steps and the hydrogel produced thereby will be described.

<Step (A1)>

Step (A1) is a step of preparing an object to be treated including a water-soluble cellulose-based compound and water. The water-soluble cellulose-based compound is a compound which is dissolved at a ratio of 0.5 parts by mass with respect to 100 parts by mass of water at 25° C., and in which some or all of hydrogen atoms of the hydroxy groups included in cellulose have been substituted with a substituent other than a hydrogen atom. Examples of such a cellulose-based compound include methylcellulose and hydroxypropyl methylcellulose (HPMC). Regarding methylcellulose and hydroxypropyl methylcellulose, known ones can be appropriately used. Examples of a commercially available product of methylcellulose include "METOLOSE MCE-4000 for food additives" manufactured by Shin-Etsu Chemical Co., Ltd. Examples of a commercially available product of hydroxypropyl methylcellulose include "METOLOSE SFE-4000 for food additives" manufactured by Shin-Etsu Chemical Co., Ltd.

The degree of substitution in the water-soluble cellulose-based compound is preferably 45% or higher, and more preferably 60% or higher, from the viewpoint of promoting phase separation when the object to be treated is heated, and the degree of substitution is preferably 65% or lower, and more preferably 63% or lower, from the viewpoint of increasing the solubility in water. Incidentally, in the present specification, the degree of substitution in the water-soluble cellulose-based compound means the proportion of introduced substituents with respect to the total amount of hydroxyl groups and the introduced substituents included in the cellulose-based compound.

The weight average molecular weight of the water-soluble cellulose-based compound is not particularly limited; however, for example, the weight average molecular weight is 100000 to 200000. In the present specification, the weight average molecular weight means a weight average molecular weight that can be determined by a GPC method and conversion relative to polystyrene standards.

The content of the water-soluble cellulose-based compound in the object to be treated that is prepared in this step is not particularly limited; however, for example, the content is 0.5% to 4.0% by mass based on the total amount of the object to be treated. The object to be treated may contain a component other than the water-soluble cellulose-based compound and water. Examples of such a component include carbon nanofibers. The content of such a component is not particularly limited; however, for example, the content is 0.01% to 15% by mass based on the total amount of the object to be treated.

The method for preparing the object to be treated is not particularly limited; however, for example, the object to be treated is obtained by mixing the water-soluble cellulose-based compound, water, and optionally a component other than the water-soluble cellulose-based compound and water. The mixing means is not particularly limited; however, for example, a magnetic stirrer may be mentioned.

<Step (B1)>

Step (B1) is a step of heating the object to be treated so as to separate water from the object to be treated. As the object to be treated is heated, the object to be treated undergoes phase separation into a gel including the cellulose-based compound and water. The heating temperature for the object to be treated is not particularly limited as long as it is a temperature capable of causing phase separation into a gel including the cellulose-based compound and water; however, for example, the heating temperature is 60° C. to 150° C. or may be 80° C. to 120° C. The heating time for the object to be treated is not particularly limited; however, for example, the heating time is 0.5 to 24 hours.

In step (B1), the object to be treated may be heated in a state in which the object to be treated is accommodated in a container. As a result, the object to be treated is caused to undergo phase separation into a gel including the cellulose-based compound and water, and then water can be separated from the object to be treated, by discharging water from the container. When the object to be treated is heated in a state in which the object to be treated is accommodated in a container, it is preferable that the container is tightly sealed from the viewpoint of preventing drying of the surface of the obtained gel including the cellulose-based compound. The heating means for the object to be treated is not particularly limited; however, for example, an oven may be mentioned.

<Step (C1)>

Step (C1) is a step of cooling the object to be treated that has acquired an increased content percentage of the cellulose-based compound through the treatment in step (B1). The cooling temperature of the object to be treated is not particularly limited as long as it is a temperature at which the object to be treated is converted to an aqueous solution or a sol; however, for example, the cooling temperature is –10° C. to 25° C. The cooling time for the object to be treated is not particularly limited; however, for example, the cooling time is 0.5 to 24 hours. The cooling means for the object to be treated is not particularly limited; however, for example, a refrigerator can be used. The object to be treated may be cooled in a state in which the object to be treated is accommodated in a container.

Figure 2:
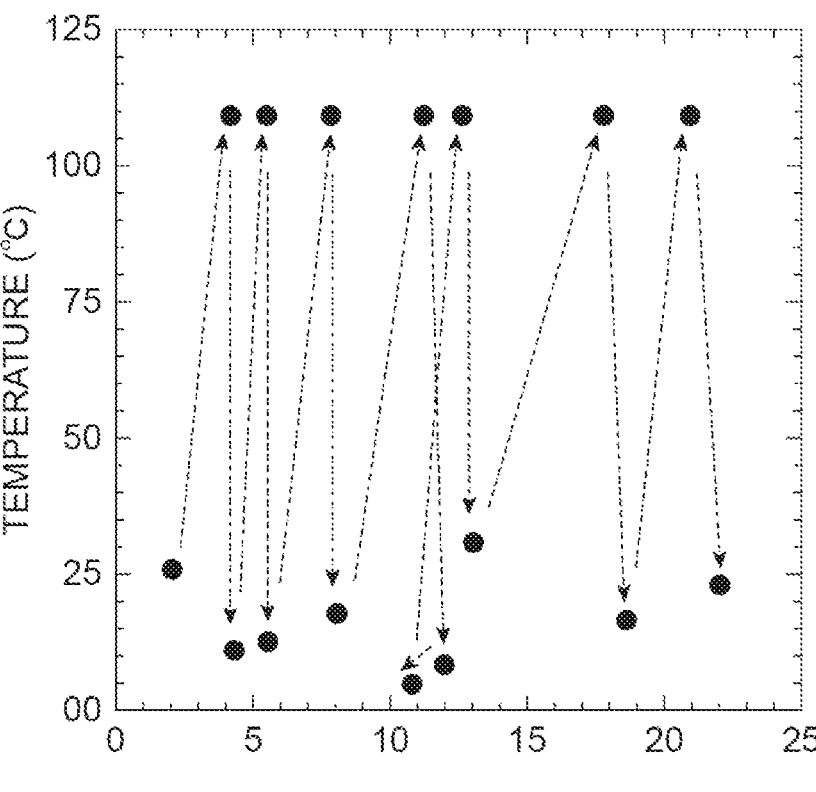
FIG. 2 is a graph showing an example of the process in which the content percentage of methylcellulose (cellulose-based compound) in an object to be treated is gradually increased.

By repeating a series of steps from step (B1) to step (C1), the content percentage of the cellulose-based compound in the object to be treated can be gradually increased (see FIG. 2). The number of times of the series of steps from step (B1) to step (C1) is not particularly limited; however, from the viewpoint of increasing the content percentage of the cellulose-based compound in the object to be treated, for example, the number of times is 2 to 15 times or 2 to 5 times, and it is preferable that the number of times is 4 or more times.

<Hydrogel>

According to the above-described production method, a hydrogel including a water-soluble cellulose-based compound and water and having a content percentage of the cellulose-based compound of 10% by mass or more is produced. The content percentage of the cellulose-based compound in this hydrogel is preferably 10% by mass or more, more preferably 12.5% by mass or more, and even more preferably 15% by mass or more, from the viewpoint of lowering the phase transition temperature from a gel to a sol. The compressive modulus at 25° C. of the hydrogel is preferably 5 kPa or higher, more preferably 10 kPa or higher, and even more preferably 30 kPa or higher. The compressive modulus means a value measured as the gradient in an elastic region during a compression test using a mechanical testing machine at 25° C.

It is preferable that the hydrogel of the present embodiment has self-repairability. In the present specification, when it is said that a hydrogel has self-repairability, it is implied that even in a case where the hydrogel is cut and then the cut surface is conglutinated, the values of the compressive modulus and the breaking strain of the hydrogel are 95% or greater based on the values of the compressive modulus and the breaking strain of the hydrogel in the case where the hydrogel is not cut. The method of conglutinating a hydrogel is not particularly limited; however, for example, the following method may be mentioned. That is, distilled water or ion-exchanged water is applied on cut surfaces of the hydrogel. Next, the hydrogel is fixed in a state in which the cut surfaces are stuck together. The fixed hydrogel is cooled, and after cooling, the hydrogel is heated. In the present specification, the breaking strain of the hydrogel means a value measured as the strain value at the time of breaking the specimen in a compression test using a mechanical testing machine at 25° C.

The temperature for phase transition from a gel to a sol of the hydrogel of the present embodiment is preferably 20° C. or lower, more preferably 10° C. or lower, and even more preferably 5° C. or lower. In the present specification, the temperature for phase transition from a gel to a sol of the hydrogel can be determined by adjusting the temperature of an object to a predetermined temperature and checking whether the object can be grasped by hand.

(Cellulose-Based Molded Body and Method for Producing the Same)

A method for producing a cellulose-based molded body according to the present embodiment includes the following steps:

(a) a step of preparing the hydrogel according to the present embodiment;

(b) a step of heating a molded body of the hydrogel in a state in which pressing force is applied to the molded body; and (c) a step of obtaining a cellulose-based molded body having a content percentage of a cellulose-based compound of 95% by mass or more through the heating treatment in step (b).

Hereinafter, each of the steps and the produced cellulose-based molded body will be described.

<Step (a)>

Step (a) is a step of preparing the hydrogel according to the present embodiment. The hydrogel and the method for producing the same are as described above.

<Step (b)>

Step (b) is a step of heating a molded body of the hydrogel in a state in which pressing force is applied to the molded body. The molded body of the hydrogel is obtained by, for example, cooling the above-mentioned hydrogel in a state in which the hydrogel is placed in a container or a mold, to cause phase transition into a sol having fluidity, and then heating this sol to cause phase transition into a gel.

The pressing force applied to the molded body of the hydrogel may be appropriately set according to the heating temperature, the heating time, and the like, which will be described below. From the viewpoint of maintaining smoothness of the hydrogel surface that is dried by heating, and obtaining a solid cellulose-based molded body, the pressing force that is applied to the molded body of the hydrogel is, for example, 10 $g/cm^2$ or more and may be 20 to 1000 $g/cm^2$ or 30 to 100 $g/cm^2$. The heating temperature for the molded body of the hydrogel may be appropriately set such that the content of the cellulose-based compound after the heating treatment reaches 95% by mass or more, and for example, the heating temperature is 60° C. to 150° C. The heating time for the molded body of the hydrogel may be appropriately set such that the content of the cellulose-based compound after the heating treatment reaches 95% by mass or more, and for example, the heating time is 0.5 to 48 hours. The heating means for the molded body of the hydrogel is not particularly limited, however, for example, an oven may be mentioned.

<Step (c)>

Step (c) is a step of obtaining a cellulose-based molded body having a content percentage of a cellulose-based compound of 95% by mass or more through the heating treatment in step (b). The content percentage of the cellulose-based compound in the cellulose-based molded body is, for example, 95% by mass or more or 100% by mass. The content percentage of water in the cellulose-based molded body is, for example, 5% by mass or less, and the content percentage of water may be 1% by mass or less or 0% by mass.

<Cellulose-Based Molded Body>

According to the above-described production method, a cellulose-based molded body having a thickness of 0.5 mm or more, having a haze of 20% or less, and having a content percentage of a cellulose-based compound of 95% by mass or more is produced. Examples of the use application of the cellulose-based molded body include a packaging material, a wrapping material, and a structural material. Examples of the form of the cellulose-based molded body include a plate and an article having a predetermined shape. The thickness of the cellulose-based molded body may be appropriately set according to the use application or the form of the cellulose-based molded body, and for example, the thickness is 0.5 mm or more and may be 1 to 5 mm or 1 to 10 mm.

The haze of the cellulose-based molded body is preferably 18% or less, and more preferably 15% or less. According to the present specification, the haze of the cellulose-based molded body means a value measured by a haze meter for a cellulose-based molded body having a thickness of 0.5 mm or more.

The total light transmittance of the cellulose-based molded body is preferably 60% or higher, and more preferably 75% or higher. According to the present specification, the total light transmittance of the cellulose-based molded body means a value obtained by measuring the quantity of incident light and the total quantity of transmitted light and calculating the total light transmittance by the formula: total light transmittance=(total quantity of transmitted light)/(quantity of incident light)×100. The quantity of incident light and the total quantity of transmitted light mean values measured by a haze meter.

The flexural modulus of the cellulose-based molded body is preferably 1 GPa or grater, and more preferably 5 GPa or greater. According to the present specification, the flexural modulus means a value measured by performing a three-point bending test using a mechanical testing machine.

(Cellulose-Based Structure and Method for Producing the Same)

The cellulose-based structure of the present embodiment is obtained by preparing two or more pieces of the above-described cellulose-based molded body, adhering these, and then completely drying the molded bodies. More specifically, the cellulose-based structure of the present embodiment is produced by, for example, the following steps. First, distilled water or ion-exchanged water is applied on the portions to be stuck together in cellulose-based molded bodies. The cellulose-based molded bodies are stuck together by means of water. Adhesion is caused to proceed by cooling the cellulose-based molded bodies that have been stuck together. The cooled cellulose-based molded bodies are completely dried by heating.

The shape of the cellulose-based structure of the present embodiment is, for example, a container and a laminated body. FIG. 1 is a perspective view illustrating an example of the cellulose-based structure. The cellulose-based structure 10 shown in FIG. 1 is a container and is composed of five sheets of cellulose-based molded bodies 1, 2, 3, 4, and 5. The cellulose-based molded bodies 1, 2, 3, and 4 constitute side faces of the container, and the cellulose-based molded body 5 constitutes the bottom face.

Second Embodiment (Cellulose-Based Molded Body and Method for Producing the Same)

In the above-described first embodiment, an embodiment of preparing a hydrogel by using a cellulose-based compound having water-solubility and then producing a cellulose-based molded body from this hydrogel has been described; however, a cellulose that does not have water-solubility may also be used as a raw material. That is, a method for producing a cellulose-based molded body according to the present embodiment includes the following steps:

(A2) a step of dissolving cellulose in an aqueous solution of lithium bromide under the temperature conditions of 100° C. or higher to obtain a cellulose-containing liquid;

(B2) a step of obtaining a molded body from the cellulose-containing liquid;

(C2) a step of removing lithium bromide from the molded body by washing the molded body;

(D2) a step of heating the molded body after removal of lithium bromide in a state in which pressing force is applied to the molded body; and (E2) a step of obtaining a cellulose-based molded body having a content percentage of cellulose of 95% by mass or more through the heating treatment in step (D2).

Hereinafter, each of the steps and the produced cellulose-based molded body will be described.

<Step (A2)>

Step (A2) is a step of dissolving cellulose in an aqueous solution of lithium bromide under the temperature conditions of 100° C. or higher to obtain a cellulose-containing liquid. Regarding the cellulose, known ones can be appropriately used. Examples of a commercially available product of cellulose include "BEMCOT" manufactured by Asahi Kasei Corp. The weight average molecular weight of cellulose is not particularly limited; however, the weight average molecular weight is, for example, 5000 to 1500000. The concentration of lithium bromide of the aqueous solution of lithium bromide may be, for example, 55% to 60% by mass with respect to the total amount of the aqueous solution of lithium bromide and may be 50% to 65% by mass.

The temperature at the time of dissolving cellulose in the aqueous solution of lithium bromide is, for example, 100° C. to 160° C. and may be 90° C. to 180° C. The blending amount of cellulose at the time of dissolving cellulose in the aqueous solution of lithium bromide is, for example, 0.5 to 10 parts by mass with respect to 100 parts by mass of the aqueous solution of lithium bromide and may be 0.1 to 25 parts by mass.

In the cellulose-containing liquid, a component other than cellulose, lithium bromide, and water may be included. Examples of such a component include carbon nanofibers. The content of such a component is, for example, 0.01% to 25% by mass based on the total amount of the cellulose-containing liquid.

<Step (B2)>

Step (B2) is a step of obtaining a molded body from the cellulose-containing liquid. A method for obtaining the molded body is not particularly limited; however, for example, a method of cooling the cellulose-containing liquid that has been heated in step (A2), in a state of being contained in the container as it is, may be mentioned. The shape of such a container is not particularly limited and can be appropriately changed in accordance with the intended shape of the cellulose-based molded body. The temperature at the time of cooling the cellulose-containing liquid is not particularly limited as long as it is a temperature at which the cellulose-containing liquid undergoes phase transition from a sol to a gel.

<Step (C2)>

Step (C2) is a step of removing lithium bromide from the molded body by washing the molded body. The washing liquid used at the time of washing the molded body is not particularly limited as long as it can remove lithium bromide from the molded body; however, for example, distilled water and ion-exchanged water may be mentioned. The method of washing the molded body is not particularly limited; however, for example, a method of immersing the molded body in the above-mentioned washing liquid may be mentioned. Whether the molded body is sufficiently washed can be determined on the basis of, for example, the concentration of lithium bromide eluted in the water used for washing.

<Step (D2)>

Step (D2) is a step of heating the molded body after the removal of lithium bromide in a state in which pressing force is applied to the molded body. The treatment conditions, heating means, and the like of step (D2) can be set to be similar to those of step (b) according to the first embodiment.

<Step (E2)>

Step (E2) is a step of obtaining a cellulose-based molded body having a content percentage of cellulose of 95% by mass or more through the heating treatment in step (D2). The content percentage of cellulose in the cellulose-based molded body may be 95% by mass or more or 100% by mass. The content percentage of water in the cellulose-based molded body is, for example, 5% by mass or less and may be 1% by mass or less or 0% by mass.

<Cellulose-Based Molded Body>

According to the above-described production method, a cellulose-based molded body having a thickness of 0.5 mm or more, having a haze of 50% or less, and having a content percentage of cellulose of 95% by mass or more is produced. The haze of the cellulose-based molded body according to the present embodiment is preferably 40% or less, and more preferably 30% or less. Other physical properties, use applications, and the like of the cellulose-molded body according to the present embodiment can be set to be similar to those of the cellulose-based molded body according to the first embodiment.

(Cellulose-Based Structure and Method for Producing the Same)

The cellulose-based structure of the present embodiment is obtained by preparing two or more pieces of the above-described cellulose-based molded body and adhering these. The means for adhering the cellulose-based molded bodies is not particularly limited; however, examples include wood glue and instantaneous adhesives. The shape of the cellulose-based structure of the present embodiment may be similar to the shape of the cellulose-based structure of the first embodiment.

EXAMPLES

Hereinafter, the present disclosure will be more specifically described based on Examples; however, the present invention is not intended to be limited to the following Examples.

The hydrogel and cellulose-based molded body according to the first embodiment were produced as follows.

[Production of Hydrogel]

Example 1a (Step (A1))

Powdered methylcellulose (manufactured by Shin-Etsu Chemical Co., Ltd., trade name: "METOLOSE MCE-4000 for food additives") as a water-soluble cellulose-based compound was dissolved in distilled water, and an object to be treated in which 2% by mass of methylcellulose was dissolved was prepared. Next, 1000 g of the obtained object to be treated was poured into a heat-resistant container (12 cm in length×12 cm in width×10 cm in height).

(Step (B1))

By heating the heat-resistant container containing the object to be treated in an oven at 110° C. for 3 hours, the object to be treated was subjected to phase separation into a methylcellulose gel and syneresis water. Subsequently, the syneresis water was discharged from the heat-resistant container.

(Step (C1))

The methylcellulose gel was left to cool at room temperature until the methylcellulose gel reached room temperature. Next, the methylcellulose gel was cooled for one hour in a refrigerator at an internal temperature of 4° C., and an object to be treated including methylcellulose and water was obtained.

After step (A1), a hydrogel including methylcellulose (8 cm in length×8 cm in width×1 cm in thickness) was obtained by subjecting the object to be treated to the treatments of step (B1) and step (C1) seven times. FIG. 2 is a graph showing the state in which the content percentage of methylcellulose in the object to be treated gradually increases. Since the obtained hydrogel had no cracks and fissures and did not have fluidity, the hydrogel was self-supported even at room temperature (25° C.) and stably existed. The obtained hydrogel could be grasped by hand. The composition of the obtained hydrogel is shown in Table 1.

Example 1b

A hydrogel was obtained in the same manner as in Example 1a, except that the object to be treated was subjected to the treatments of step (B1) and step (C1) four times instead of seven times. Since the obtained hydrogel had no cracks and fissures and did not have fluidity, the hydrogel was self-supported even at room temperature (25° C.) and stably existed. The obtained hydrogel could be grasped by hand. The composition of the obtained hydrogel is shown in Table 1.

Example 1c

A hydrogel was obtained in the same manner as in Example 1a, except that hydroxypropyl methylcellulose (manufactured by Shin-Etsu Chemical Co., Ltd., trade name: "METOLOSE SFE-4000 for food additives") was used instead of using methylcellulose as the water-soluble cellulose-based compound. Since the obtained hydrogel had no cracks and fissures and did not have fluidity, the hydrogel was self-supported even at room temperature (25° C.) and stably existed. The obtained hydrogel could be grasped by hand. The composition of the obtained hydrogel is shown in Table 1.

Comparative Example 1a

An object to be treated was subjected to treatment in the same manner as in Example 1a, except that the treatments of step (B1) and step (C1) were performed once instead of seven times. The obtained object to be treated was a methylcellulose sol at room temperature (25° C.) and did not become a hydrogel. The composition of the obtained object to be treated is shown in Table 1.

TABLE 1

|  |  | Example 1a | Example 1b | Example 1c | Comparative Example 1a |
|---|---|---|---|---|---|
| Composition (% by mass) | Cellulose-based compound | 22 | 12 | 18 | 5 |
|  | Water | 78 | 88 | 82 | 95 |

[Measurement of Compressive Modulus of Hydrogel]

Each of the hydrogels according to the Examples was gouged out, and a cylindrical (25 mm in diameter×10 mm in thickness) specimen was obtained. For the obtained sample, the compressive modulus at 25° C. was measured. The compressive modulus was measured by performing a compression test on the cylindrical specimen by using a mechanical testing machine (manufactured by SHIMADZU CORPORATION, trade name: "EZ-TEST"). The compressive modulus of the hydrogel according to Example 1a was 50 kPa.

[Measurement of Storage Modulus of Hydrogel]

For each of the hydrogels of Examples, the storage moduli at 20° C., 40° C., and 60° C. were measured. For the measurement, a rheometer (Anton Paar MCR501) was used. The measurement conditions were set to a rate of temperature increase of 1° C./min, a shear strain of 0.001%, and a frequency scan (0.1 to 100 rad/sec) mode. The storage moduli at 20° C., 40° C., and 60° C. of the hydrogel according to Example 1a were 30 kPa, 40 kPa, and 60 kPa, respectively.

[Evaluation of Self-Repairability of Hydrogel]

Each of the hydrogels according to the Examples was gouged out, and two cylindrical (25 mm in diameter×10 mm in thickness) samples were obtained. One of the samples was cut with a knife so as to obtain two semicylinders. Next, distilled water was applied on the cut surfaces by using a cotton swab. Subsequently, the two semicylinders were fixed in a state of being stuck together, by sticking together the cut surfaces and winding a vinyl tape around the outer periphery. The fixed two semicylinders were stored for one hour in a refrigerator in which the internal temperature was set to 4° C. and then were heated for 15 minutes at 110° C. in an oven, and after being heated, the two semicylinders were left to cool at room temperature. After the cooling, the cut surfaces of the two semicylinders were adhered, and the sample had the same shape as the other sample that was not cut. Furthermore, for the sample that was cut and adhered and the sample that was not cut, the compressive modulus was measured in the same manner as in the measurement of the compressive modulus of the hydrogel. Furthermore, the breaking strain at 25° C. was measured for both the samples. For the measurement, the compressive modulus was measured by performing a compression test on a cylindrical specimen by using a mechanical testing machine (manufactured by SHIMADZU CORPORATION, trade name: "EZ-TEST"). When the values of the compressive modulus and breaking strain of the sample that was cut and adhered were 95% or more based on the values of the compressive modulus and breaking strain of the sample that was not cut, the hydrogel was considered to have self-repairability.

With regard to the hydrogel according to Example 1a, the compressive moduli of the sample that was cut and adhered and the sample that was not cut were both 50 kPa, and the breaking strains were both 40%. That is, the hydrogel according to Example 1a had self-repairability.

[Measurement of Phase Transition Temperature of Hydrogel]

The phase transition temperature of the hydrogels according to the Examples was determined by adjusting the temperature of each of the hydrogels according to the Examples to a predetermined temperature and checking whether the object can be grasped by hand. The phase transition temperatures of the hydrogels according to Examples 1a and 1b were 10° C. and 20° C., respectively.

[Production of Cellulose-Based Molded Body]

The hydrogels according to the Examples were subjected to the following step (b) and step (c) to obtain cellulose-based molded bodies.

(Step (b) and Step (c))

Each of the hydrogels according to the Examples was accommodated in a container. A pressing force of 30 g/cm² was applied to the hydrogel by placing a weight on the top face of the hydrogel, with a plate interposed therebetween. While in this state, the hydrogel was dried in an oven that had been heated to 110° C., until the hydrogel became completely dry. As a result, a cellulose-based molded body (2 mm in thickness) was obtained. The obtained cellulose-based molded body was solid without any cracks and fissures, and the density was 1.3 g/cm³. The content percentages of methylcellulose in the cellulose-based molded bodies according to Examples 1a and 1b were both 100% by mass.

[Measurement of Haze of Cellulose-Based Molded Body]

The haze in the thickness direction of each of the cellulose-based molded bodies according to the Examples was measured. For the measurement, a haze meter HZ-V3 (apparatus name, manufactured by Suga Test Instruments Co., Ltd.) was used. The measurement was carried out by a double beam method (light source: C-light). The haze values of the cellulose-based molded bodies according to Examples 1a and 1b were both 15%.

[Total Light Transmittance of Cellulose-Based Molded Body]

The total light transmittance in the thickness direction of each of the cellulose-based molded bodies according to the Examples was measured. The total light transmittance was obtained by measuring the quantity of incident light and the total quantity of transmitted light and calculating the total light transmittance by the formula: total light transmittance= (total quantity of transmitted light)/(quantity of incident light)×100. For the measurement, a haze meter HZ-V3 (apparatus name, manufactured by Suga Test Instruments Co., Ltd.) was used. The total light transmittance values of the cellulose-based molded bodies according to Examples 1a and 1b were both 80%.

[Measurement of Flexural Modulus of Cellulose-Based Molded Body]

For each of the cellulose-based molded bodies according to the Examples, a three-point bending test was carried out using a mechanical testing machine (manufactured by SHIMADZU CORPORATION, trade name: "EZ-TEST"), and the flexural modulus was measured. The measurement conditions were set to a distance between fulcrums of 40 mm and a testing speed of 1 mm/min. The flexural moduli of the cellulose-based molded bodies according to Examples 1a and 1b were both 2.5 GPa.

[Production of Cellulose-Based Structure]

Five sheets each of the cellulose-based molded body according to each of the Examples were prepared, and distilled water was applied on the principal surfaces of these cellulose-based molded bodies by using a cotton swab. Next, the five sheets of the cellulose-based molded body were laminated by sticking together each of the cellulose-based molded bodies such that the principal surfaces faced each other, with water interposed therebetween. Next, the five sheets of the cellulose-based molded body stuck together were stored for one hour in a refrigerator at an internal temperature of 4° C., and adhesion of the cellulose-based molded bodies was caused to proceed. Subsequently, the five sheets of the cellulose-based molded body were heated for 10 minutes in an oven at 110° C., and the stuck surfaces of the cellulose-based molded bodies were caused to become cloudy. Next, all the five sheets of the cellulose-based molded bodies were heated for 2 hours in an oven at 110° C. in a state of being interposed between clips (double clips for stationery) such that force was applied in a direction perpendicular to the principal surfaces of the cellulose-based molded bodies, and the five sheets of the cellulose-based molded bodies were completely dried to obtain a cellulose-based structure in which the five sheets of the cellulose-based molded bodies were adhered. The cellulose-based structure had a thickness of 1 cm and was solid without any cracks and fissures, and the cellulose-based structure was capable of cutting with a saw, punching with a drill, and hammering of a nail.

A cellulose-based molded body and a cellulose-based structure according to the second embodiment were produced as follows.

[Production of Cellulose-Based Molded Body]

Example 2a

A cellulose-based molded body was obtained by carrying out the following steps (A2) to (E2).

(Step (A2))

Lithium bromide was dissolved in distilled water, and an aqueous solution of lithium bromide in which 60% by mass of lithium bromide was dissolved was prepared. Cellulose was dissolved in the prepared aqueous solution of lithium bromide such that the concentration of cellulose (manufactured by Asahi Kasei Corp., trade name: "BEMCOT") was 2% by mass, and the solution was further stirred while being heated to 120° C. or higher, to prepare a cellulose-containing liquid.

(Step (B2))

700 g of the obtained cellulose-containing liquid was poured into a heat-resistant container (12 cm in length×12 cm in width×10 cm in height) and was left to cool at 25° C., and a molded body, which was a gel, was obtained.

(Step (C2))

The obtained molded body was washed by immersing the molded body in distilled water, and the lithium bromide included therein was removed.

(Step (D2) and Step (E2))

The molded body from which lithium bromide was removed was accommodated m a container. Next, a pressing force of 30 g/cm$^2$ was applied to the molded body by placing a weight on the top face of the molded body, with a plate interposed therebetween. While in this state, the molded body was dried in an oven heated to 110° C. until the molded body became completely dry. As a result, a cellulose-based molded body (2 mm in thickness) was obtained. The cellulose content percentage of the obtained cellulose-based molded body was 100% by mass. The obtained cellulose-based molded body was solid without any cracks and fissures, and the density was 1.3 g/cm$^3$.

[Measurement of Haze, Total Light Transmittance, and Flexural Modulus of Cellulose-Based Molded Body]

For the obtained cellulose-based molded body, measurement of the haze, the total light transmittance, and the flexural modulus was carried out in the same manner as in Example 1a. As a result, the haze was 50%, the total light transmittance was 75%, and the flexural modulus was 5.0 GPa.

[Production of Cellulose-Based Structure]

Five sheets of the cellulose-based molded body were prepared, and by using these, a box-shaped container having four side faces and one bottom face was assembled (see FIG. 1). That is, at the places where the cellulose-based molded bodies adjoined, wood glue was applied using a cotton swab. Next, the five sheets of the cellulose-based molded bodies were temporarily fixed with tapes and left to stand until the wood glue hardened, and a container was obtained. The obtained container was solid without any cracks and fissures and was capable of cutting by means of a saw, punching by means of a drill, and hammering of a nail.

INDUSTRIAL APPLICABILITY

According to the present disclosure, a cellulose-based molded body having a certain thickness and having transparency, and a method for producing the same are provided. Furthermore, according to the present disclosure, a hydrogel useful for the production of the above-described cellulose-based molded body, and a method for producing the same are provided.

REFERENCE SIGNS LIST 1 to 5: cellulose-based molded body, 10: cellulose-based structure.

The invention claimed is:

1. A hydrogel comprising a water-soluble cellulose-based compound and water,
   wherein the content percentage of the water-soluble cellulose-based compound is 15% by mass or more,
   the water-soluble cellulose-based compound is at least one selected from the group consisting of methylcellulose and hydroxypropyl methylcellulose,
   the compressive modulus at 25° C. is 5 kPa or greater,
   the hydrogel has self-repairability, and
   the weight average molecular weight of the water-soluble cellulose-based compound is 100000 to 200000.

2. The hydrogel according to claim 1, wherein the phase transition temperature from a gel to a sol is 20° C. or lower.

3. A method for producing a cellulose-based molded body, the method comprising:
   (a) a step of preparing the hydrogel according to claim 1;
   (b) a step of heating the molded body of the hydrogel in a state of having pressing force applied to the molded body; and
   (c) a step of obtaining a cellulose-based molded body having a content percentage of the cellulose-based compound of 95% by mass or more through the heating treatment in step (b).

4. A method for producing a cellulose-based molded body, the method comprising:
   (a) a step of preparing the hydrogel according to claim 2;
   (b) a step of heating the molded body of the hydrogel in a state of having pressing force applied to the molded body; and
   (c) a step of obtaining a cellulose-based molded body having a content percentage of the cellulose-based compound of 95% by mass or more through the heating treatment in step (b).

5. The method for producing a cellulose-based molded body according to claim 3, wherein the cellulose-based molded body having a thickness of 0.5 mm or more and having a haze of 20% or less.

6. A method for producing a hydrogel according to claim 1, the method comprising:

(A1) a step of preparing an object to be treated including a water-soluble cellulose-based compound and water;

(B1) a step of heating the object to be treated so as to separate water from the object to be treated; and (C1) a step of cooling the object to be treated that has acquired an increased content percentage of the water-soluble cellulose-based compound through the treatment in step (B1), wherein a series of steps from step (B1) to step (C1) are repeated until the content percentage of the water-soluble cellulose-based compound in the object to be treated reaches 10% by mass or more.

7. The method for producing a hydrogel according to claim 6, wherein in step (B1), the object to be treated is heated in a state of having the object to be treated accommodated in a container.

8. The method for producing a hydrogel according to claim 6, wherein the water-soluble cellulose-based compound is methylcellulose.

* * * * *